United States Patent
McSweeney et al.

(10) Patent No.: US 9,386,338 B2
(45) Date of Patent: Jul. 5, 2016

(54) AUTOMATIC CHANNEL SELECTION AND CONTROL

(71) Applicant: Verizon Patent and Licensing Inc., Arlington, VA (US)

(72) Inventors: Brian M. McSweeney, Medway, MA (US); Edward M. Eggerl, Catonsville, MD (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/445,437

(22) Filed: Jul. 29, 2014

(65) Prior Publication Data

US 2016/0037204 A1    Feb. 4, 2016

(51) Int. Cl.
| | |
|---|---|
| *H04N 5/445* | (2011.01) |
| *H04N 21/426* | (2011.01) |
| *H04N 21/435* | (2011.01) |
| *H04N 21/482* | (2011.01) |
| *H04N 21/475* | (2011.01) |
| *H04N 21/433* | (2011.01) |
| *H04N 21/466* | (2011.01) |
| *H04N 21/458* | (2011.01) |
| *H04N 21/45* | (2011.01) |

(52) U.S. Cl.
CPC ......... *H04N 21/4263* (2013.01); *H04N 21/435* (2013.01); *H04N 21/4334* (2013.01); *H04N 21/458* (2013.01); *H04N 21/4532* (2013.01); *H04N 21/4668* (2013.01); *H04N 21/4755* (2013.01); *H04N 21/4826* (2013.01)

(58) Field of Classification Search
CPC ................................................. H04N 21/4826
See application file for complete search history.

(56) References Cited

U.S. PATENT DOCUMENTS

| | | | | |
|---|---|---|---|---|
| 8,429,688 B1 * | 4/2013 | Silver | ................. | H04N 21/4826 709/219 |
| 2003/0110500 A1 * | 6/2003 | Rodriguez | ............. | H04H 60/46 725/46 |
| 2011/0047568 A1 * | 2/2011 | Yeh | ..................... | H04N 5/44543 725/38 |
| 2012/0030586 A1 * | 2/2012 | Ketkar | ................. | G06F 17/3089 715/751 |
| 2012/0030587 A1 * | 2/2012 | Ketkar | .............. | G06F 17/30038 715/751 |
| 2013/0111526 A1 * | 5/2013 | Glowaty | ........... | G06F 17/30817 725/53 |
| 2016/0044357 A1 * | 2/2016 | Wang | ................. | H04N 21/2668 725/14 |

* cited by examiner

*Primary Examiner* — Fernando Alcon

(57) ABSTRACT

A selection of a television program through a set-top box (STB) may be detected, and a counter value associated with the program may be incremented after the STB presents the program for a certain amount of time. The incremented counter value may be evaluated to determine whether the incremented counter value satisfies a threshold. When the incremented counter value satisfies the threshold, another broadcast associated with the program, such as another episode in a related series, may be identified. The identified broadcast is presented on a particular channel at a particular time, and the STB may automatically tune to the particular channel at the particular time to cause the STB to provide the broadcast without receiving an input from the user.

20 Claims, 10 Drawing Sheets

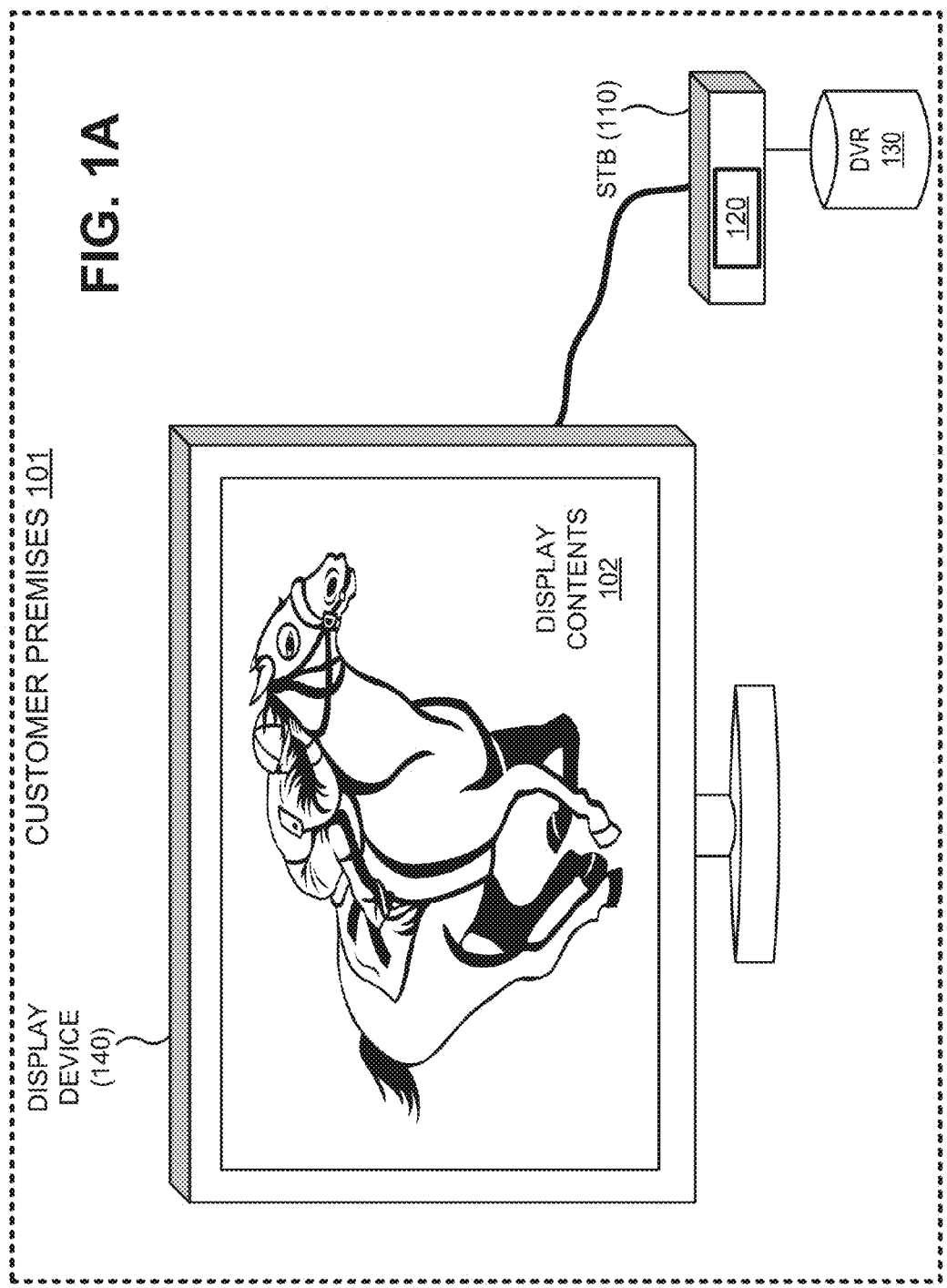

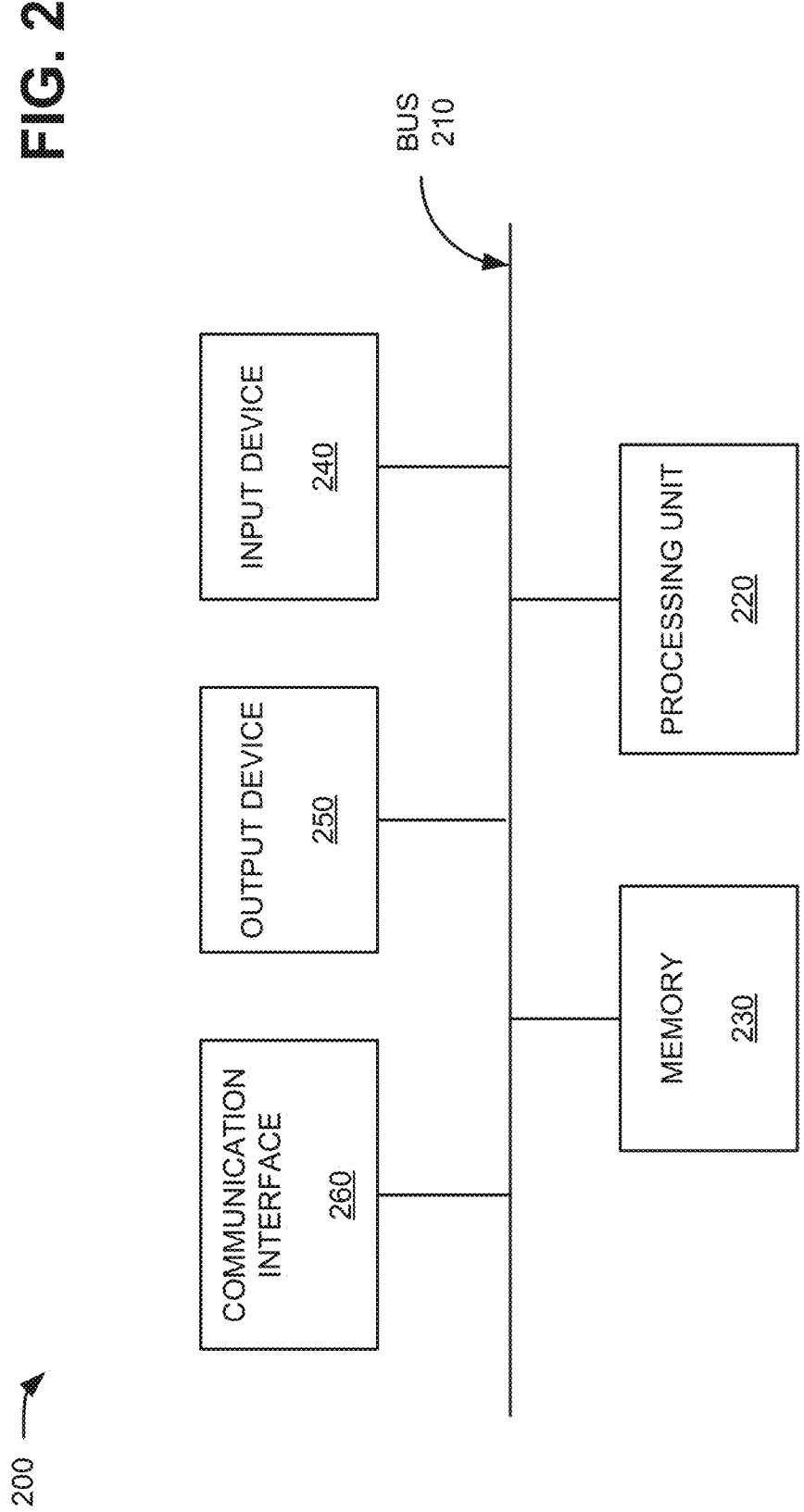

| PROGRAM METADATA 510-1 | PROGRAM COUNTER VALUE 520-1 | PROGRAM COMMAND DATA 530-1 |
|---|---|---|
| ... | ... | ... |
| PROGRAM METADATA 510-N | PROGRAM COUNTER VALUE 520-N | PROGRAM COMMAND DATA 530-N |

500

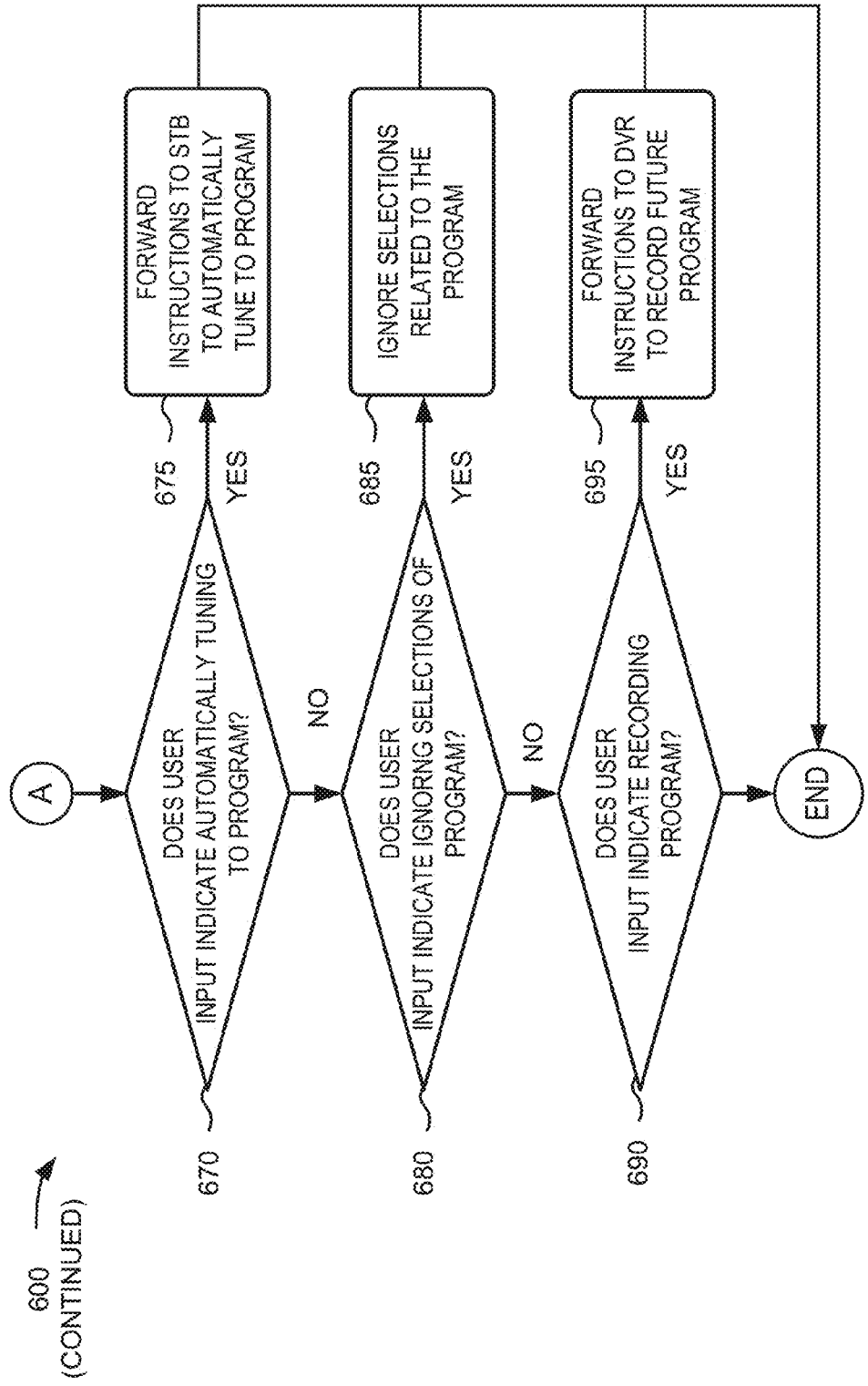

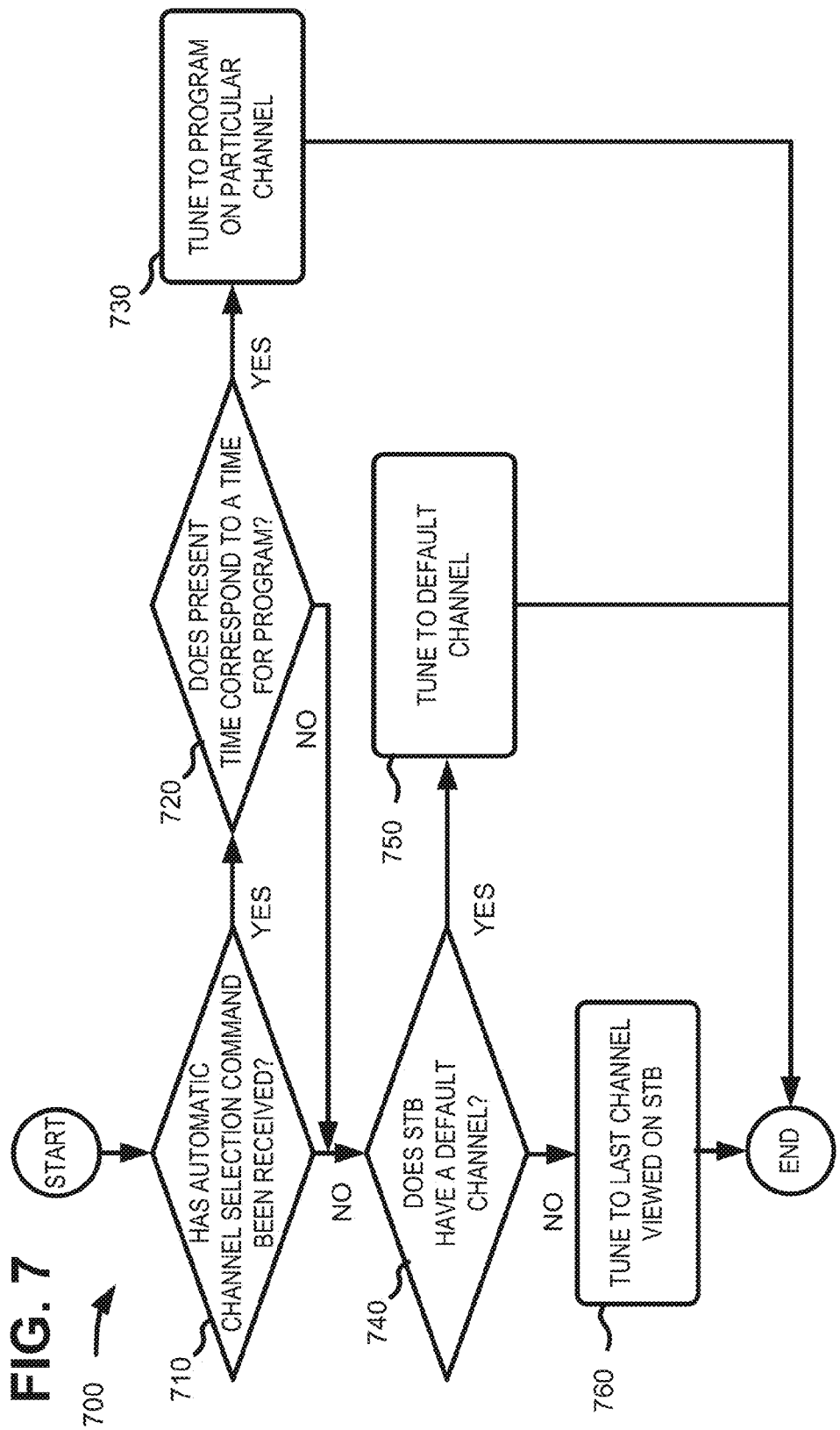

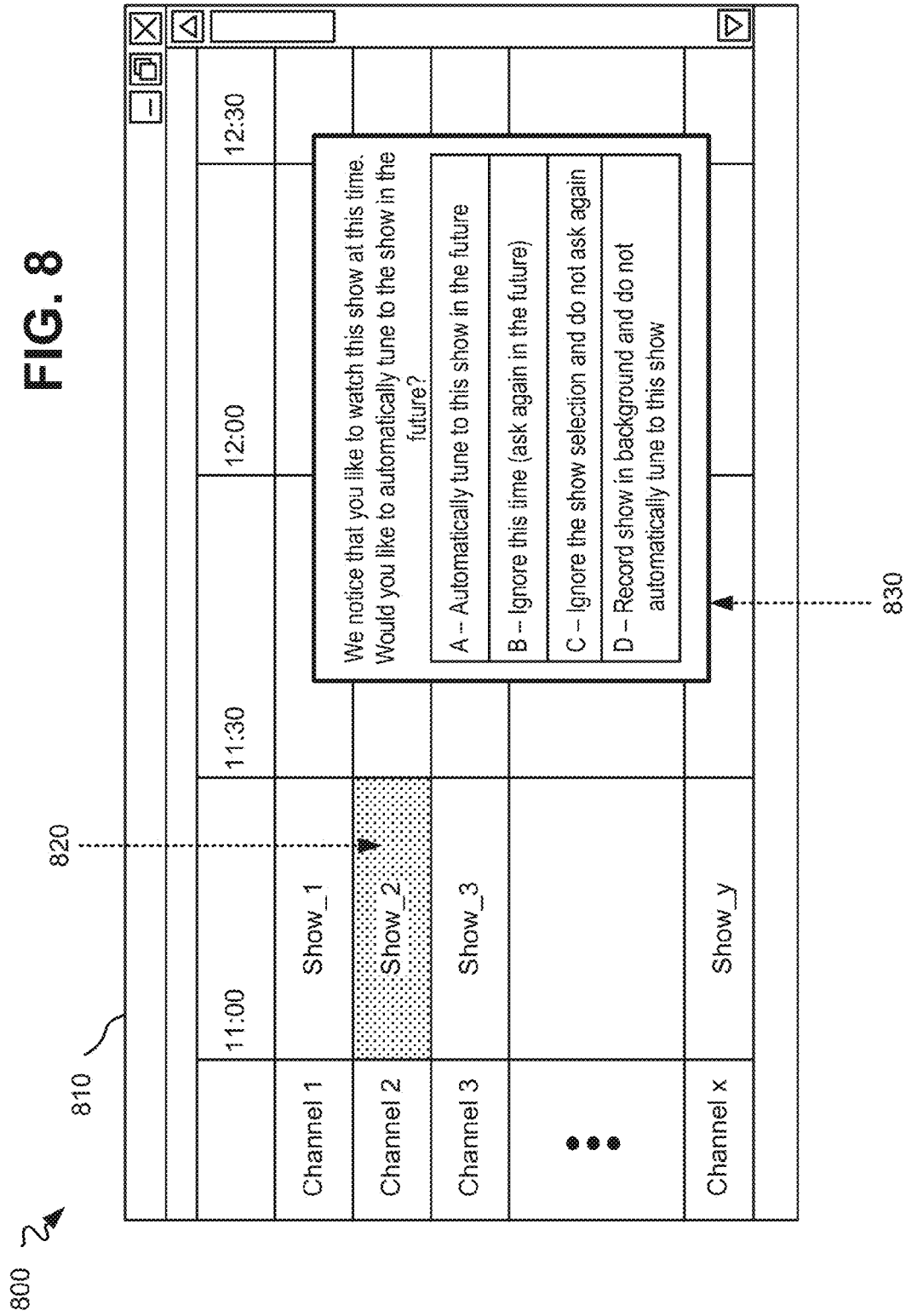

AUTOMATIC CHANNEL SELECTION AND CONTROL

BACKGROUND

In a subscription television service, a service provider may distribute multiple television channels. The television channels may carry multimedia content to subscribers' residences through wireless (e.g., terrestrial or satellite communication signals) or wired (e.g., a coaxial cable or fiber optic network) connections. The multiple television channels may be transmitted concurrently through the connections using, for example, frequency division multiplexing (FDM). At a headend associated with the service provider, the television channels may be translated into different frequencies, encrypted to prevent unauthorized access, and multicast to the subscribers. At the subscribers' residences, set-top boxes (STBs) may receive inputs (e.g., from remote controls or other input devices) selecting desired channels, and the STBs may decrypt and translate the desired channel backs to their original frequencies (i.e., the basebands) for presentation by a display device.

BRIEF DESCRIPTION OF THE DRAWINGS

FIG. 1A shows an exemplary customer premises according to one implementation;

FIG. 2 shows exemplary components of a device included in the environment of FIG. 1B, according to one implementation;

FIGS. 6A and 6B show an exemplary process for automatically selecting a channel to present through the STB of FIG. 3, according to one implementation;

FIG. 7 shows a exemplary process for determining a channel to present to a user through STB 110 for automatically selecting a channel to present through the STB of FIG. 3, according to one implementation; and FIG. 8 shows an exemplary display that may be generated by the STB and presented by a display device included in the environment of FIG. 1B, according to one implementation.

DETAILED DESCRIPTION OF THE PREFERRED EMBODIMENTS

Figure 1B:
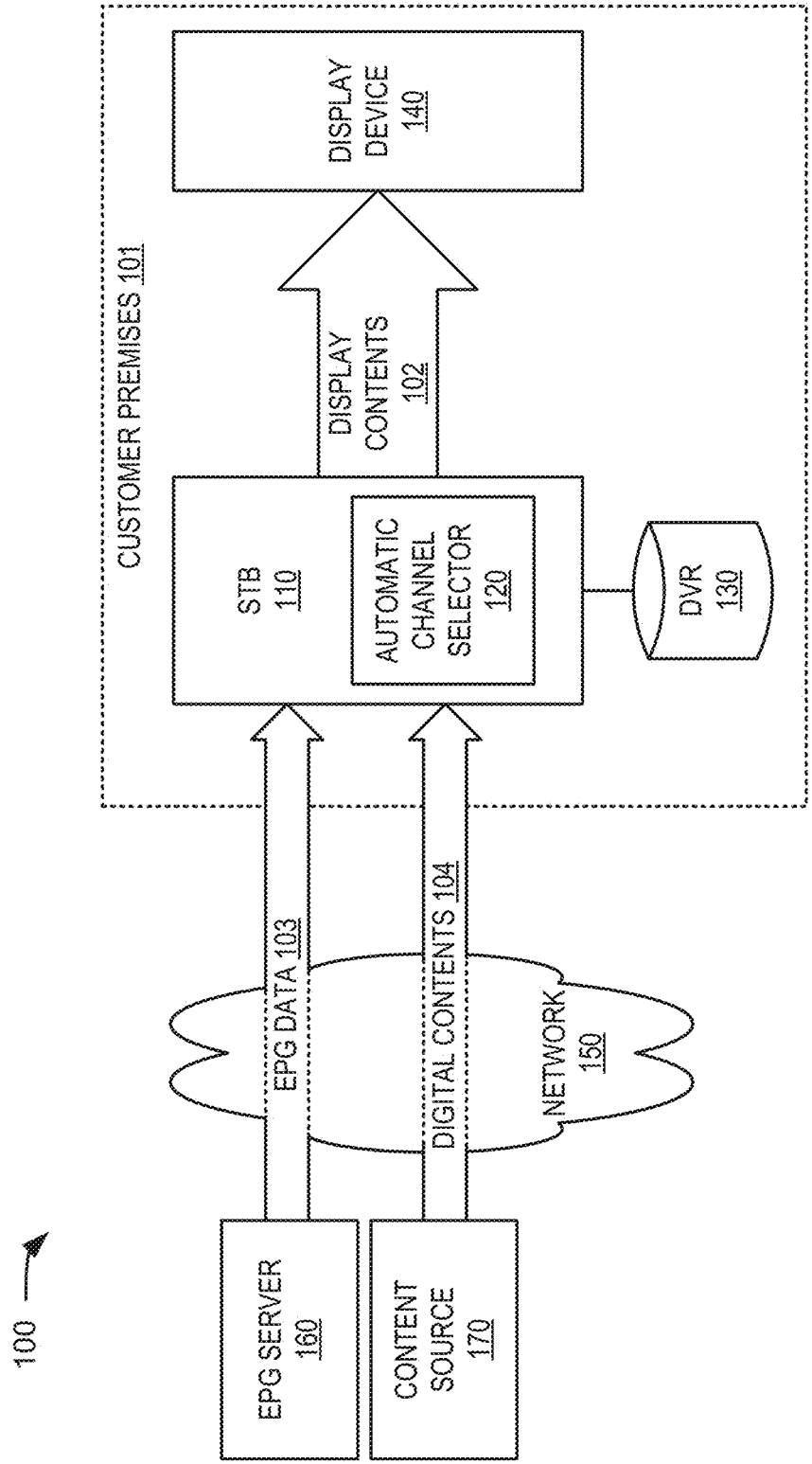
FIG. 1B shows an exemplary environment that includes the customer premises shown in FIG. 1A, according to one implementation.

The following detailed description refers to the accompanying drawings. The same reference numbers in different drawings may identify the same or similar elements. The following detailed description does not limit the invention.

In exemplary embodiments described herein, a selection of e.g., a television (TV) program through a set-top box (STB) may be detected, and a counter value associated with the program may be incremented when the STB presents the program for a threshold amount of time. The incremented counter value may be evaluated to determine whether the incremented counter value satisfies a counter value threshold (a particular integer number). When the incremented counter value satisfies the counter value threshold, another broadcast associated with the program, such as another episode in a related series, may be identified. The identified broadcast is presented on a particular channel at a particular time, and the STB may be automatically tuned to the particular channel at the particular time to cause the STB to provide the broadcast without receiving an input from the user requesting the broadcast.

FIG. 1A shows an exemplary customer premises 101 according to one implementation. As shown in FIG. 1A, customer premises 101 may include, for example, an STB 110, an automatic channel selector 120, a digital video recorder (DVR) 130, and a display device 140 to present display contents 102 received from STB 110.

As described herein, STB 110 may provide display contents 102 associated with a subscription television service received via a network, such as a cable network and/or an optical fiber network. For example, STB 110 may receive digital content such as multicast stations provided through the subscription television service. STB 110 may perform various processing of received digital content, such as to decode the digital contents, perform digital rights management and authentication control functions (e.g., decryption of the digital contents), etc. and provide, as display contents 102, the processed digital contents for presentation on display device 140. STB 110 may further forward, to DVR 130, digital contents to be recorded.

A user may use an input device, such as a remote control device (not shown in FIG. 1A), to provide an input to STB 110 to switch channels, configure STB 110 (e.g., turning on closed captioning, modifying audio/vision output formats, etc.), and/or control other functions on STB 110. For example, a user may submit an input related to controlling DVR 130 associated with STB 110, accessing an electronic programming guide (EPG) identifying contents available via the channels, accessing a video on demand (VOD) catalog identifying contents available via VOD, and/or activating other functions available via STB 110.

Automatic channel selector 120 may include, for example, hardware and/or software to control a channel (or station) provided by STB 110 to DVR 130 and/or display device 140. In one implementation described herein, automatic channel selector 120 may identify programs selected for viewing by a user. Automatic channel selector 120 may identify the programs based on, for example, EPG data received by STB 110. Automatic channel selector 120 may determine that the user is watching a program if, for example, STB 110 remains on a particular channel for at least a threshold duration (e.g., 20 minutes) during a time period when the particular channel is showing the program. Automatic channel selector 120 may cause STB 110 to automatically tune to and/or cause DVR 130 to record a future showing of a program (e.g., another episode in a series associated with the program) based on determining that the user has previously viewed at least a threshold quantity (e.g., 3) of prior showings (e.g., episodes) related to the program.

In one implementation, automatic channel selector 120 may store a record of programs viewed by the user via STB 110, and may provide an interface to allow the user to select a desired action with respect to a particular program viewed by the user the threshold quantity of times. For example, the interface may allow the user to select whether STB 110 should automatically tune to a channel when the channel is presenting the particular program, whether automatic channel selector 120 should ignore the user's viewing of the program, and/or whether DVR 130 should record the particular program.

In the implementation shown in FIG. 1A, automatic channel selector 120 may be included in STB 110. It should be appreciated, however, that automatic channel selector 120 may be included in a device that is separate from STB 110. For example, automatic channel selector 120 may be included in another component of customer premises 101, such as in another STB 110 (not shown), DVR 130, display device 140, or another device that is not shown in FIG. 1A, such as a broadband home router (BHR) or a computing/communications device. In addition or alternatively, automatic channel selector 120 may be located remotely from customer premises 101, such as on a remote computing/communications device (not shown) that communicates with STB 110.

Continuing with customer premises 101 in FIG. 1A, DVR 130 may include storage to access and store digital contents presented on a selected channel at a particular time. For example, DVR 130 may include a memory to store digital content decoded by STB 110. DVR 130 may further process the digital content for storage and/or process the stored content for presentation. DVR 130 may also resolve conflicts in instructions, such as mediate commands to record different contents on different channels at the same time.

Display device 140 may include a display to provide a visual output corresponding to display contents 102 received from STB 110. Display device 140 may further process display contents 102, such as to perform a digital-to-analog conversion of display contents 102.

The configuration of components of customer premises 101 illustrated in FIG. 1A is for illustrative purposes only, and other configurations may be implemented. Customer premises 101 may include additional, fewer and/or different components than those depicted in FIG. 1A. For example, customer premises 101 may include multiple STBs 110, and automatic channel selector 120 may select channels to be automatically presented by the STBs 110. In one implementation, automatic channel selector 120 may select a channel to display by a particular STB 110 based on prior programming selections received by multiple STBs 110 located at the customer premises. In another example, automatic channel selector 120 selects a channel to display by the particular STB 110 based on prior programming selections received by the particular STB 110.

FIG. 1B shows an exemplary environment 100 in which EPG data 103 and digital content 104 may be provided to customer premises 101. As shown in FIG. 1B, environment 100 may include, for example, customer premises 101 (and its components STB 110, automatic channel selector 120, DVR 130, display device 140), a network 150; an EPG server 160 that provides EPG data 103 to STB 110; and a contents source 170 providing digital contents 104 to STB 110. STB 110, automatic channel selector 120, DVR 130, and display device 140 may correspond to the components of customer premises 101 described in the discussion of FIG. 1A.

Network 150 may include, for example, a network that distributes or makes available services, such as, for example, television services, mobile communication services, and/or Internet services. Network 150 may be a satellite-based network and/or a terrestrial-based network. Network 150 may include one or more networks of various types including, for example, a cable network (e.g., an optical cable network), a satellite network, a telecommunications network (e.g., a Public Switched Telephone Network (PSTN) or Public Land Mobile Network (PLMN)), an Advanced Television Systems Committee (ATSC) standards network, a local area network (LAN), a wide area network (WAN), a metropolitan area network (MAN), an intranet, and/or the Internet. Network(s) 150 may, in some implementations, include one or more QAM channels (or other types of modulated or broadcast channels) for delivering EPG data 103 and digital contents 104 to STB 110.

EPG server 160 may deliver EPG data 103 that includes various information related to the display of an EPG through STB 110. An EPG, as referred to herein, may present television program scheduling information that identifies current and upcoming programming available through STB 110. The EPG may include an interactive programming guide (IPG) that permits a user to navigate through the scheduling information interactively, for example, to select a program for display and/or to request additional information regarding the program. The EPG may enable the user to identify desired programming using interactive menus, and a user may interact with STB 110 via the EPG to select a channel to be displayed through display device 140 and/or to schedule the recording of the desired programming by DVR 130.

Content source 170 may include one or more network devices, or other types of computation or communication devices, that store and deliver digital contents 104 to users (e.g., to STB 110 at customer premises 101). Content source 170 may deliver the digital contents 104 to STB 110 via one or more channels (e.g., Quadrature Amplitude Module (QAM) channels) over network 150. Digital contents 104 may include, for example, television broadcasts, VOD programming, and/or other video contents.

The configuration of components of environment 100 illustrated in FIG. 1B is for illustrative purposes only, and other configurations may be implemented. For example, environment 100 may include additional, fewer and/or different components than those depicted in FIG. 1A. For example, environment 100 may include a remote user device (not shown) that is positioned away from customer premises 101, and the remote user device may be used to submit a request to STB 110, such as to change a displayed channel.

FIG. 2 is a diagram of exemplary components of a device 200 that may be replicated into a plurality of devices, each of which may correspond, respectively, to one or more devices of environment 100 shown in FIG. 1B, such as STB 110, automatic channel selector 120, DVR 130, display device 140, a device (e.g., an intermediate node, router, etc.) of network 150, EPG server 160, and/or content source 170. In one exemplary implementation, one or more of the devices of environment 100 may include one or more devices 200 or one or more components of device 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application-specific integrated circuits (ASICs), field-programmable gate array (FPGAs), etc.

Memory 230 may include a random-access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. Alternatively, or additionally, one or more components of device 200 may perform one or more other tasks described as being performed by one or more other components of device 200.

Figure 3:
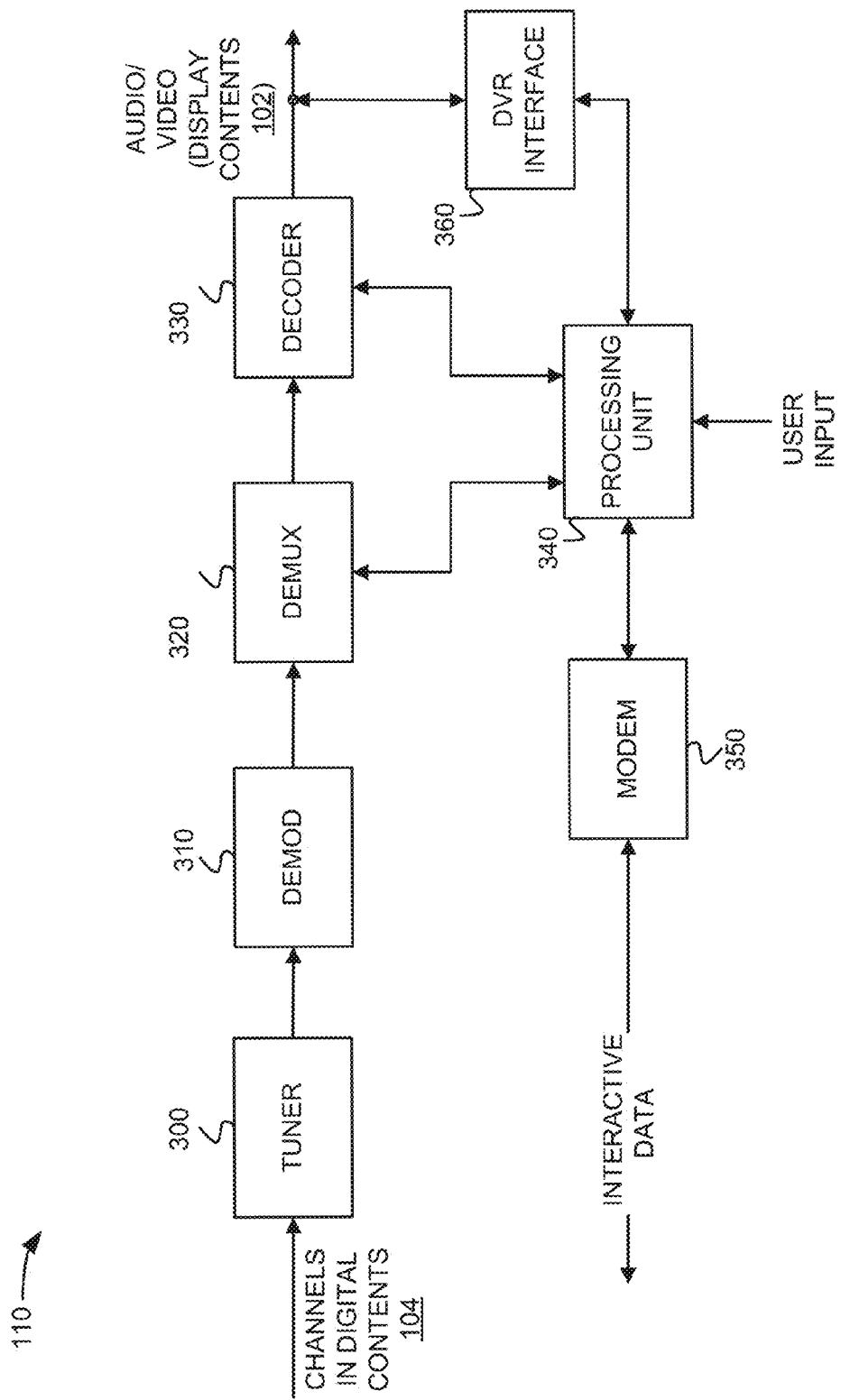
FIG. 3 shows exemplary components of an STB included in the environment of FIG. 1B, according to one implementation.

FIG. 3 depicts exemplary components of STB 110. As shown in FIG. 3, STB 110 may include, for example, a tuner 300, a demodulator 310, a demultiplexer 320, a decoder 330, a processing unit 340, a modulator/demodulator (modem) 350, and a DVR unit 360. Tuner 300 may select and tune to specific digital contents by tuning to one of many different multicast input channels. Each of the input channels may be digitally modulated using, for example, QAM, or other type of modulation, and demodulator 310 may demodulate the information in the channel selected by tuner 300 to produce a transport stream, such as an MPEG-2 or MPEG-4 transport stream corresponding to containing the audio, video and/or other information related to selected digital contents to be presented by display device 140 (FIG. 1).

Continuing with FIG. 3, demultiplexer 320 may select and decrypt compressed audio and video from the transport stream (e.g., as display contents 102) for presentation by display device 140. Decoder 330 may decode and decompress the decrypted audio and video information for a selected portion of digital contents 104. Processing unit 340 may include, for example, a microprocessor that controls the operations performed by tuner 300, demodulator 310, demultiplexer 320, decoder 330, modem 350 and DVR interface 360 based on user input (e.g., input received by STB 110 via a remote control device). Modem 350 may send and receive interactive data (e.g., EPG data 103) that may be processed by processing unit 340. DVR interface 360 may enable STB 110 to exchange digital contents data and instructions to DVR 130, such as to provide decrypted audio and video information (e.g., digital contents 104) to DVR 130 to digitally record and store audio and video contents associated with the particular digital contents decoded by decoder 330. Similarly, STB 110 may receive recorded digital contents data from DVR 130 and may provide related display contents 102 for display by display device 140.

Although FIG. 3 shows exemplary components of STB 110, in other implementations, STB 110 may include fewer components, different components, differently arranged components, or additional components than those depicted in FIG. 3. For example, STB 110 may, instead of receiving receive EPG data 103 from EPG server 160, STB may include one or more components to process (e.g., to perform visual and/or audio analysis of) digital contents 104 to identify the particular digital contents carried by a selected channel at a particular time. Alternatively or additionally, one or more components of STB 110 may perform one or more other tasks described as being performed by one or more other components of STB 110.

Figure 4:
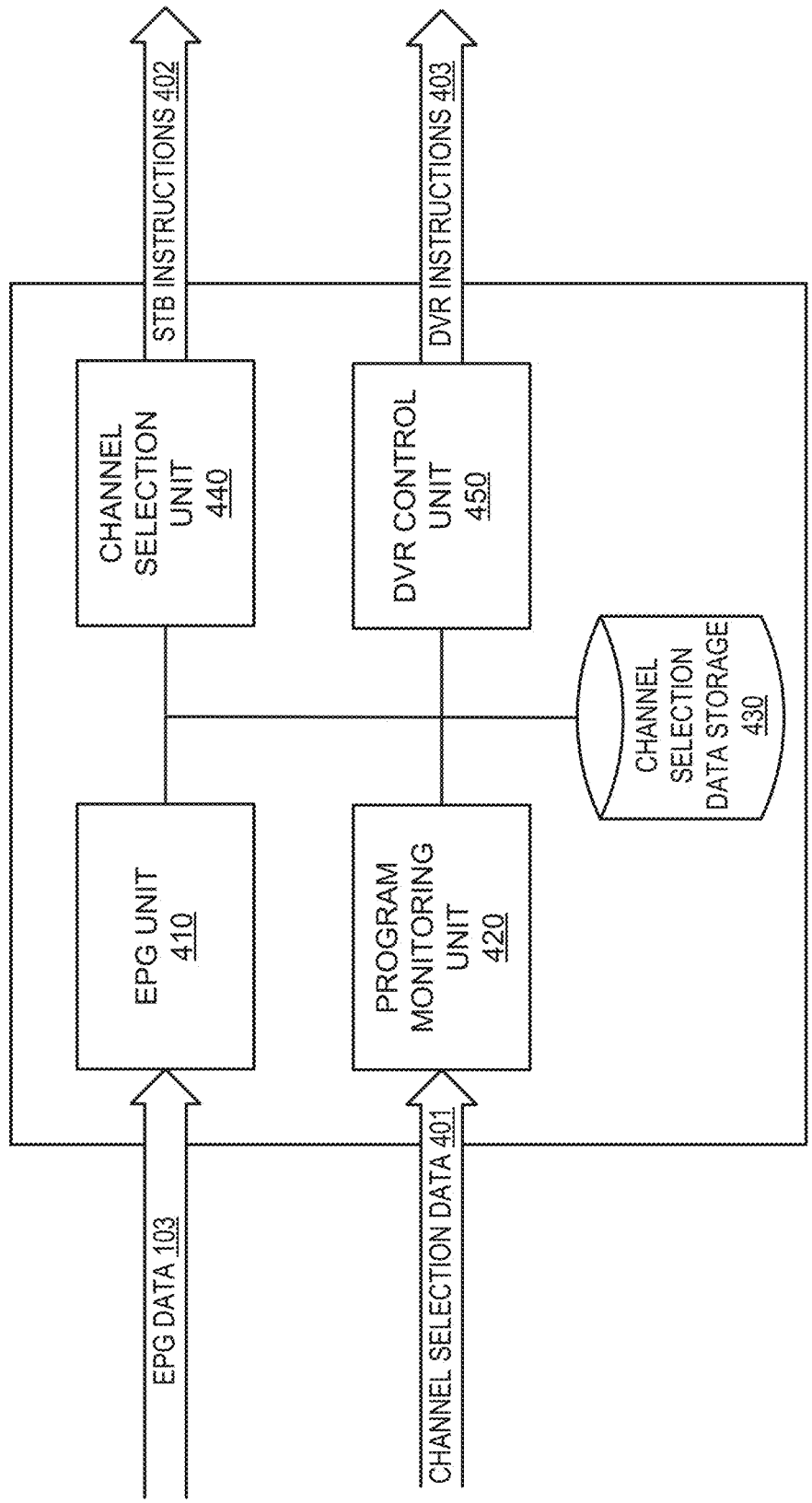
FIG. 4 shows exemplary functional components of an automatic channel selector included in the environment of FIG. 1B, according to one implementation.

FIG. 4 is a schematic diagram showing exemplary functional components of automatic channel selector 120. The functional components shown in FIG. 4 may be implemented in hardware and/or software within automatic channel selector 120. For example, in one implementation, the functional components shown FIG. 4 may be implemented as instructions stored in memory 230 that are executed by processing unit 220. The functional components of automatic channel selector 120 may include, for example, an EPG unit 410, a program monitoring unit 420, a channel selection data storage 430, a channel selection unit 440, and/or a DVR control unit 450.

EPG unit 410 may receive EPG data 103 (e.g., from EPG server 160) and may provide program scheduling data to program monitoring unit 420, channel selection unit 440, and/or DVR control unit 450. The program scheduling data may include metadata regarding programs being presented in different channels carried in digital contents 104. The metadata may include, for example, identifiers for the programs and other information, such as data identifying actors, genres, awards, ratings, summaries, etc. associated with the programs.

Program monitoring unit 420 may process the program scheduling data (received from EPG unit 410) along with channel selection data 401 received from STB 110 to identify programs watched by a user. For example, program monitoring unit 420 may process channel selection data 401 to identify that the user watched a program shown on a particular channel at a particular time, and program monitoring unit 420 may process the program scheduling data to determine an identifier and/or other metadata for the program. Program monitoring unit 420 may further record data regarding the programs to channel selection data storage 430. For example, channel selection data storage 430 may store data identifying programs viewed by a user and a frequency that the programs are viewed by the user. Channel selection data storage 430 may be located to customer premises 101 and may be encrypted to prevent stored data from being accessed outside of customer premises 101.

Channel selection unit 440 may process data stored in channel selection data storage 430 to generate STB instructions 402 for causing STB 110 to automatically change channels to present certain programs frequently viewed by a user. For example, channel selection unit 440 may identify particular programs viewed by the user at least a threshold number of times and may process the program scheduling data (received from EPG unit 410) to identify particular channels and particular times associated with future showings of the particular program. In one example, channel selection unit 440 may use an identifier for the particular program (e.g., a title) to identify the future showings. In additional or alternatively, channel selection unit 440 may use other metadata associated the particular program (e.g., an actor, genre, summary, etc.) to identify the future showings, even if the future showings are associated with different titles. For example, different channels may list the same series of programs using different identifiers, and channel selection unit 440 may identify related programs using the metadata. In another example, if a user frequently watches a type of sporting event (e.g., baseball games), channel selection unit 440 may use metadata in the program scheduling data to identify additional broadcasts of related sporting events, even if the additional broadcasts are associated with different titles (e.g., programs entitled "Sporting Event A" and "Sporting Event B").

In one example, channel selection unit 440 may identify future showings associated with, but different from, a frequently watched program. For example, if a user watches several episodes in a series, channel selection unit 440 may identify broadcasts of additional episodes, in the series, that differ from the prior viewed episodes. For example, channel selection unit 440 may identify programs having similar identifying data, but having different metadata (e.g., data identifying production years, plot summaries, etc.)

In one implementation, program monitoring unit 420 may identify a program frequently viewed by a user on a particular channel or a particular group of channels, and channel selection unit 440 may identify related future broadcasts (e.g., another episode of the series) being shown on the particular channel or the particular group of channels. For example, channel selection unit 440 may process only EPG data related to a particular channel or the particular group of channels. Alternatively, channel selection unit 440 may identify all channels to which the user subscribes, and may identify related future broadcasts related to the program on any of the subscribed-to channels.

Channel selection unit 440 may further generate and forward STB instructions 402 to cause STB 110 to tune to the particular channels at the particular times associated with the frequently watched programs. In one implementation, channel selection unit 440 may update channel selection data storage 430 to include data associated with STB instructions 402.

DVR control unit 450 may process data stored in channel selection data storage 430 to generate DVR instructions 403 to selectively cause DVR 130 to automatically record certain programs viewed by a user. For example, DVR control unit 450 may identify particular programs viewed by the user at least a threshold number of times and may process the program scheduling data (received from EPG unit 410) to identify particular channels and particular times associated with future showings of the particular programs. DVR control unit 450 may further generate and forward DVR instructions 403 to cause DVR 130 to record the particular channels at the particular times associated with the frequently watched programs. DVR control unit 450 may further interface with channel selection unit 440 to generate STB instructions 402 that cause STB 110 to provide the particular channels at the particular times to DVR 130. In one implementation, DVR control unit 450 may update channel selection data storage 430 to include data associated with DVR instructions 403. In another implementation, DVR control unit 450 may forward DVR instructions 403 to STB 110 to control DVR 130 via DVR interface 360.

Although FIG. 4 shows exemplary functional components of automatic channel selector 120, in other implementations, automatic channel selector may include fewer functional components, different functional components, differently arranged functional components, or additional functional components than those depicted in FIG. 4. For example, automatic channel selector 120 may not include EPG unit 410 and may, instead, receive the program scheduling data from STB 110. Alternatively, or additionally, one or more functional components of automatic channel selector 120 may perform one or more other tasks described as being performed by one or more other components of automatic channel selector 120.

Figure 5:
FIG. 5 shows an exemplary data table that may be stored in one of the functional components of the automatic channel selector of FIG. 4, according to one implementation.

FIG. 5 shows an exemplary data table 500 that may be stored by channel selection data storage 430. As shown in FIG. 5, data table 500 may include, for example, program metadata 510 (shown in FIG. 5 as program metadata 510-1 through 510-N), program counter values 520 (shown in FIG. 5 as program counter values 520-1 through 520-N), and program command data 530 (shown in FIG. 5 as program command data 530-1 through 530-N). In FIG. 5, program metadata 510, program counter value 520, and program command data 530 in a particular row may be associated with a corresponding program, e.g., a particular TV program associated with Row 1 having program metadata 510-1, program counter value 520-1, and program command data 530-1, etc.

Program metadata 510 may include information associated with a program, such as a program identifier. Program metadata 510 may further include information identifying, for example, an actor, a rating, a genre, a summary, a future show time, etc. associated with a program. Program metadata 510 may be populated based on processing EPG data 103 by EPG unit 410.

Program counter value 520 may identify a number of times that a user has viewed an associated program. For example, program monitoring unit 420 may increment program counter value 520 when a user views the associated program for at least a threshold amount of time. In one implementation, program monitoring unit 420 may decrease or reset program counter value 520 for an associated program when a user does not view the associated program during a particular time period. In another example, program monitoring unit 420 may decrease or reset program counter value 520 for an associated program when a user changes away from the program (e.g., if the user does not watch the program after STB 110 automatically switches to the program).

Program command data 530 may include information identifying commands associated with a program. For example, program command data 530 may include information identifying when STB 110 should tune to the program (e.g., STB instructions 402) and/or when DVR 130 should record the program (e.g., DVR instructions 403).

In one implementation, program command data 530 may include different instructions for different users. For example, program command data 530 may include instructions to cause STB 110 to tune to a first channel at a particular time if the STB is being used by a parent and to tune to a second, different channel at the particular time if the STB is being used by a child. In another example, program command data 530 may include instructions to cause STB 110 to tune to the first channel at a particular time if the user enters an access code (e.g., to access a particular channel to access a program having a particular rating) and to tune to the second channel at the particular time if the user does not enter the access code. In these examples, the first and second channels may be determined based on prior program selections in the manner described above.

Although FIG. 5 shows exemplary data fields included in data table 500, in other implementations, data table 500 may include fewer, different, differently-arranged, or additional data fields than those depicted in FIG. 5. Alternatively, or additionally, one or more data fields of data table 500 may store data being described as being stored in one or more other data fields of data table 500.

Figure 6A:
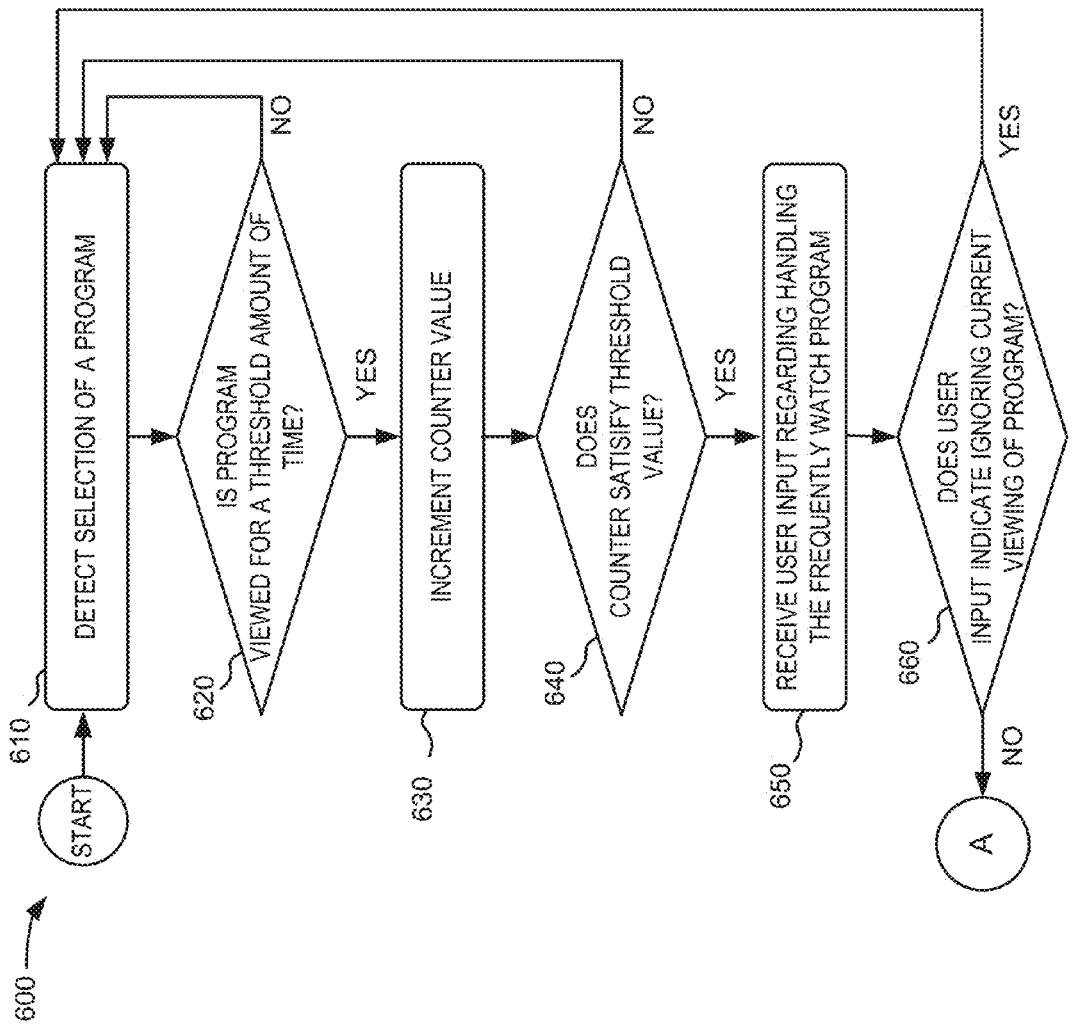

FIGS. 6A and 6B are flow diagrams of an exemplary process 600 for automatically selecting a channel to present through STB 110. Process 600 is described with respect to components in environment 100 shown in FIG. 1B and/or the components of automatic channel selector 120 shown in FIG. 4. In one implementation, process 600 may be performed by automatic channel selector 120. Alternatively, or additionally, some or all of process 600 may be performed by another device or group of devices, including or excluding automatic channel selector 120.

As shown in FIG. 6A, process 600 may include detecting a selection of a program (block 610) and determining whether the program is viewed for at least a threshold amount of time (block 620). For example, program monitoring unit 420 may receive channel selection data 401 from STB 110 identifying an initial channel selection by a user, and program monitoring unit 420 may access processed EPG data 103 (e.g., from EPG unit 410) to identify a program and/or other metadata associated with the channel selection. Program monitoring unit 420 may update data table 500 to include program metadata 510 associated with the program.

In block 620, program monitoring unit 420 may process channel selection data 401 to identify whether another channel change is received from the user during a threshold amount of time after the initial channel selection. If a channel change is received during the threshold amount of time (block 620-No), process 600 may return to block 610 and program monitoring unit 420 may determine whether a new program associated with the channel change is viewed for at least the threshold amount of time. The threshold amount of time may correspond, for example, to a particular time period (e.g., 15 minutes), a portion of a length of the program (e.g., half the program length), a portion of an average amount of time the user has viewed other programs (e.g., half the average amount of time), etc.

If a program is viewed for at least a threshold amount of time (block 620-Yes), process 600 may include incrementing a counter value associated with the program (block 630) and determining whether the incremented counter value satisfies a threshold value (block 640). For example, program monitoring unit 420 may increment program counter value 520 in block 630. Program monitoring unit 420 may increment program counter value 520 by a particular amount (e.g., increasing the counter value by one (1)) or by different amounts based on other factors. For example, program monitoring unit 420 may increment program counter value 520 by an amount that varies based on a length of time that a user watches the program (e.g., increasing program counter value 520 by one (1) if the user watches the program for a first length of time, or increasing program counter value 520 by two (2) if the user watches the program for a second, longer length of time). Additionally or alternatively, program counter value 520 may be adjusted by an amount that is determined based on additional factors, such a rating submit by the user or whether the user causes DVR 130 to record the program (e.g., increasing program counter value 520 by a greater amount if the user submits a positive rating and/or causes DVR 130 to record the program).

In block 640, channel selection unit 440 may determine whether program counter value 520 associated with a program satisfies (e.g., is equal or greater than) the threshold value. The threshold value may be a static value (e.g., determining whether program counter value 520 is greater than 3) or the threshold value may be relative (e.g., determining whether a program counter value 520 for a particular program is greater than program counter values 520 for a particular number or percentage of other programs). If the incremented counter value does not satisfy the threshold value (block 640-No), process 600 may return to block 610 and program monitoring unit 420 may monitor for an additional selection related to the program.

If, alternatively, the incremented counter value satisfies the threshold value (block 640-Yes), automatic channel selector 120 may receive a user input regarding handling of the frequently watch program (block 650). For example, automatic channel selector 120 may cause STB 110 to display, via display device 140, a menu to prompt a selection by a user from possible actions related to the frequently viewed program. For example, referring to both FIGS. 6A and 6B, the menu may allow a user to submit user input to: (1) cause automatic channel selector 120 to ignore a current selection of the program, such as to take no action based on the current selection but to continue to monitor selections of the program (block 660, further discussed below); (2) request STB 110 to automatically tune to a future broadcast of the program (block 670, further discussed below); (3) cause automatic channel selector 120 to ignore selections of the program, such as to take no action and to stop monitoring selections of the program (block 680, further discussed below); or (4) request DVR 130 to record the future broadcast of the program (block 690, further discussed below).

If the user input relates to ignoring the current viewing of the program (block 660—Yes), process 600 may return to block 610 and program monitoring unit 420 may continue to monitor for additional program selections.

With respect to FIG. 6B, if the user input indicates automatically tuning to a future broadcast of the program (block 670—Yes), channel selection unit 440 may forward instructions to STB 110 to automatically tune to the future broadcast of the program (block 675). For example, channel selection unit 440 may identify a particular channel and a particular time associated with a future broadcast of the program, and selection unit 440 may forward STB instructions 402 to STB 110 to cause STB 110 to tune to the particular channel at the particular time.

If the user input indicates ignoring any selections of program (block 680-Yes), automatic channel selector 120 may ignore the selections related to the program (block 685). For example, program monitoring unit 420 may remove entries (e.g., a row) in data table 500 related to the program. Alternatively, program monitoring unit 420 may update program data 530 associated with the program to take no actions, regardless of program counter value 520 for the program.

If the user input indicates automatically recording a future broadcast of the program (block 690—Yes), DVR control unit 450 may forward instructions to DVR 130 to automatically record the future broadcast of the program (block 695). For example, DVR control unit 450 may forward DVR instructions 403 to DVR 130 to cause DVR 130 to record a content provided on a particular channel at a particular time.

FIG. 7 is a flow diagram of an exemplary process 700 for determining a channel to present to a user through STB 110. In one implementation, process 700 may be performed by STB 110. Alternatively, or additionally, some or all of process 600 may be performed by another device or group of devices, including or excluding STB 110.

As shown in FIG. 7, process 700 may include determining whether STB 110 has received an automatic channel selection command (block 710). For example STB 110 may determine whether STB instructions 402 have been received from channel selection unit 440, and STB instructions 402 may identify, for example, a particular time when a particular channel will present a frequently-watched program.

If STB 110 receives multiple STB instructions 402 for a particular time, STB 110 may mediate among the multiple STB instructions 402 in block 710. For example, if STB 110 receives STB instructions 402 for different users, STB 110 may identify a user currently using STB 110, and may present a program associated with the identified user. For example, STB 110 may prompt a user to provide an input, such as alphanumeric string, and STB 110 may identify the user based on the input. In another example, STB 110 may select from multiple STB instructions 402 based on other factors. For example, STB 110 may execute an STB instruction 402 for a program having a highest program counter value 520.

If STB 110 has received an automatic channel selection command (block 710—Yes), STB 110 may determine whether a present (e.g., current) time corresponds to the particular time associated with the automatic channel selection command (block 720). If the present time corresponds to the particular time associated with the automatic channel selection command (block 720—Yes), STB 110 may tune to the program on the particular channel (block 730).

Continuing with FIG. 7, process 700 may further include determining if STB 110 has a default (e.g., favorite) channel defined (block 740) if STB 110 has not received automatic channel selection commands (block 710—No) or the present time does not correspond to the particular time associated with the received automatic channel selection command (block 720—No). For example, STB 110 may receive an input from a user identifying the default channel, or may dynamically determine the default channel based on other user inputs, such as prior channel selections. If STB 110 has a defined default channel (block 740—Yes), STB 110 may tune to the default channel (block 750). Alternatively, if STB 110 does not have a defined default channel (block 740—No), STB 110 may continue to present a last channel viewed by the user (block 760).

FIG. 8 shows an exemplary display 800 that may be generated by STB 110 (e.g., based on commands received from automatic channel selector 120) and presented by display device 140 in implementations described herein. As shown in FIG. 8, display 800 may include, for example, EPG interface 810, a program selection indication 820, and a channel selection menu 830.

As shown in FIG. 8, display 800 may present EPG interface 810. EPG interface 810 may include data identifying programs shown on different channels. In the example shown in FIG. 8, EPG interface 810 may include a table form with different channels associated with rows (the channels may be identified in the left column of EPG interface 810), and different times associated with columns (the times, either AM or PM, may be identified in a top row of EPG interface 810). Each of the entries in EPG interface 810 may identify programs available on a corresponding channel at a corresponding time. A user may navigate within EPG interface 810 to view different channels and/or times. In the EPG interface 810 shown in FIG. 8, a user may submit an input (e.g., via a remote control device) to move up or down to select between different channels or move left or right to select between different times.

As further shown in FIG. 8, program selection indication 820 may provide a graphical indication of a channel and/or time selected by a user within EPG interface 810. For example, program selection indication 820 may include a particular color, brightness, font, graphical symbol, or other indication to distinguish the selected program from other programs identified within EPG interface 810.

Selection of a particular program in EPG interface 810 (e.g., as indicated by program selection indication 820) may cause display 800 to present channel selection menu 830. Channel selection menu 830 may present options available to a user related to handling a frequently viewed program, such as: "A—Automatically tune to this show in the future"; "B—Ignore this time (ask again in the future)"; "C—Ignore the show selection and do not ask again"; and "D-Record show in background and do not automatically tune to this show," as shown in FIG. 8.

A selection of the "A—Automatically tune to this show in the future" option may prompt channel selection unit 440 to generate STB instructions 402 that cause STB 110 to automatically tune to a future broadcast of the program (e.g., corresponding to block 675).

A selection of the "B— Ignore this time (ask again in the future)" option may cause program monitoring unit 420 to continue to monitor for additional selections of the program without automatic channel selector 120 performing another action with respect to the program at the time of selecting option "B" (e.g., corresponding to block 660-Yes).

A selection of the "C— Ignore the show selection and do not ask again" option may cause program monitoring unit 420 to stop monitoring program selections related to the program and may cause automatic channel selector 120 to perform no actions with respect to the program (e.g., corresponding to block 685).

A selection of the "D—Record show in background and do not automatically tune to this show" option may prompt DVR control unit 450 to generate DVR instructions 403 that cause DVR 130 to identify a future broadcast of the program and to record the future broadcast (e.g., corresponding to block 695).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6A, 6B, and 7, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   detecting, by a processor, a selection of a program through a set-top box (STB);

determining, by the processor, whether the STB provides the program in connection with the selection for at least a threshold amount of time;
incrementing, by the processor, a counter value associated with the program when the STB provides the program for at least the threshold amount of time;
determining, by the processor, whether the incremented counter value satisfies a counter value threshold;
presenting, by the processor and when the counter value satisfies the counter value threshold, a menu, wherein the menu presents a first option related to automatically tuning to another broadcast related to the program, a second option related to ignoring the selection of the program and continuing to monitor for other selections of the program, a third option related to ignoring the selection of the program and the other selections of the program, and a fourth option related to recording the other broadcast related to the program;
receiving, by the processor, an input associated with the menu;
detecting, by a processor, another selection related to the program through the STB;
re-presenting, by the processor, the menu based on detecting the other selection when the input corresponds to the second option, wherein the menu is not re-presented when the selection corresponds to the third option;
identifying, by the processor and when the input corresponds to one of the first option or the fourth option, the other broadcast related to the program, wherein the other broadcast is presented on a first channel at a first time;
causing, by the processor, the STB to tune to the first channel at the first time when the input corresponds to the first option; and
causing, by the processor, a digital video recorder (DVR) to record the first channel at the first time when the input corresponds to the fourth option.

2. The method of claim 1, wherein the selection is associated with a second channel at a second time, and wherein identifying the other broadcast includes:
accessing, based on the second channel and the second time, an electronic program guide (EPG) to identify a first set of metadata set associated with the selection;
accessing the EPG to identify a plurality of sets of metadata associated with a plurality of broadcasts, wherein the plurality of broadcasts include the other broadcast;
comparing the first set of metadata and the plurality of sets of metadata; and
identifying, based on comparing the first set of metadata to the plurality of sets of metadata, a second set of metadata, wherein the second set of metadata corresponds to the first set of metadata, and wherein the second set of metadata is associated with the other broadcast.

3. The method of claim 2, wherein the selection is associated with a user, and wherein accessing the EPG to identify the plurality of sets of metadata includes:
identifying channels subscribed to by the user, wherein the plurality of broadcasts are carried on the channels.

4. The method of claim 1, further comprising:
causing the STB to tune to a default channel at a time that differ from the first time, wherein the default channel differs from the first channel.

5. A device, comprising:
a memory configured to store instructions; and
a processor configured to implement one or more of the instructions to:
detect a selection of a program through a set-top box (STB),
determine whether the STB provides the program in connection with the selection for at least a threshold amount of time,
increment a counter value associated with the program when the STB provides the program for at least the threshold amount of time,
determine whether the incremented counter value satisfies a counter value threshold,
present, when the counter value satisfies the counter value threshold, a menu, wherein the menu presents a first option related to automatically tuning to another broadcast related to the program, a second option related to ignoring the selection of the program and continuing to monitor for other selections of the program, a third option related to ignoring the selection of the program and the other selections of the program, and a fourth option related to recording the other broadcast related to the program,
receive an input related to the menu,
detect another selection related to the program through the STB,
re-present the menu based on detecting the other selection when the input corresponds to the second option, wherein the menu is not re-presented when the input corresponds to the third option,
identify, when the input corresponds to one of the first option or the fourth option, the other broadcast related to the program, wherein the other broadcast is presented on a first channel at a first time,
cause the STB to tune to the first channel at the first time when the input corresponds to the first option, and
cause a digital video recorder (DVR) to record the first channel at the first time when the input corresponds to the fourth option.

6. The device of claim 5, wherein the selection is associated with a second channel at a second time, and wherein the processor, when identifying the other broadcast, is further configured to:
access, based on the second channel and the second time, an electronic program guide (EPG) to identify a first set of metadata set associated with the selection,
access the EPG to identify a plurality of sets of metadata associated with a plurality of broadcasts, wherein the plurality of broadcasts include the other broadcast,
compare the first set of metadata and the plurality of sets of metadata, and
identify, based on comparing the first set of metadata to the plurality of sets of metadata, a second set of metadata, wherein the second set of metadata corresponds to the first set of metadata, and wherein the second set of metadata is associated with the other broadcast.

7. The device of claim 6, wherein the selection is associated with a user, and wherein the processor, when accessing the EPG to identify the plurality of sets of metadata, is further configured to:
identify channels subscribed to by the user, wherein the plurality of broadcasts are carried on the identified channels.

8. The device of claim 5, wherein the processor is further configured to:
cause the STB to tune to a default channel at a time that differ from the first time, wherein the default channel differs from the first channel.

9. A computer-readable memory device, to store instructions, the instructions comprising:
one or more instructions that, when executed by a processor, cause the processor to:

detect a selection of a program through a set-top box (STB), determine whether the STB provides the program in connection with the selection for at least a threshold amount of time, increment a counter value associated with the program when the STB provides the program for at least the threshold amount of time, determine whether the incremented counter value satisfies a counter value threshold, present, when the counter value satisfies the counter value threshold, a menu, wherein the menu presents a first option related to automatically tuning to another broadcast related to the program, a second option related to ignoring the selection of the program and continuing to monitor for other selections of the program, a third option related to ignoring the selection of the program and the other selections of the program, and a fourth option related to recording the other broadcast related to the program, receive an input related to the menu, detect another selection related to the program through the STB, re-present the menu based on detecting the other selection when the input corresponds to the second option, wherein the menu is not re-presented when the input corresponds to the third option, identify, when the input corresponds to one of the first option or the fourth option, the other broadcast related to the program, wherein the other broadcast is presented on a first channel at a first time, cause the STB to tune to the first channel at the first time when the input corresponds to the first option, and cause a digital video recorder (DVR) to record the first channel at the first time when the input corresponds to the fourth option.

10. The computer-readable memory device of claim 9, wherein the selection is associated with a second channel at a second time, and wherein the one or more instructions, when causing the processor to identifying the other broadcast, further cause the processor to:

access, based on the second channel and the second time, an electronic program guide (EPG) to identify a first set of metadata set associated with the selection, access the EPG to identify a plurality of sets of metadata associated with a plurality of broadcasts, wherein the plurality of broadcasts include the other broadcast, compare the first set of metadata and the plurality of sets of metadata, and identify, based on comparing the first set of metadata to the plurality of sets of metadata, a second set of metadata, wherein the second set of metadata corresponds to the first set of metadata, and wherein the second set of metadata is associated with the other broadcast.

11. The computer-readable memory device of claim 10, wherein the selection is associated with a user, and wherein the one or more instructions, when causing the processor, to access the EPG to identify the plurality of sets of metadata, further cause the processor to:

identify channels subscribed to by the user, wherein the plurality of broadcasts are carried on the identified channels.

12. The computer-readable memory device of claim 9, wherein the one or more instructions further cause the processor to:

cause the STB to tune to a default channel at a time that differ from the first time, wherein the default channel differs from the first channel.

13. The method of claim 1, wherein the selection is received from a user, and wherein the method further comprises:

identifying an average amount of time that the user watched one or more other programs; and calculating the threshold amount of time as a portion of the average amount of time that the user watched the one or more other programs.

14. The method of claim 1, further comprising:

determining a time period between the selection of the program and the other selection related to the program; and decreasing the counter value when the time period is more than a threshold length of time.

15. The method of claim 1, wherein the selection is received from a user, and wherein incrementing the counter value further includes:

receiving a review of the program from the user, wherein the review corresponds to a positive review or a negative review;

incrementing the counter value rating by a first value when the review corresponds to the negative review; and incrementing the counter value rating by a second value that is greater than the first value when the review corresponds to the positive review.

16. The device of claim 5, wherein the selection is received from a user, and wherein the processor is further configured to:

identify an average amount of time that the user watched one or more other programs, and calculate the threshold amount of time as a portion of the average amount of time that the user watched the one or more other programs.

17. The device of claim 5, wherein the selection is received from a user, and wherein the processor is further configured to:

determine a time period between the selection of the program and the other selection related to the program; and reset the counter value when the time period is more than a threshold length of time.

18. The method of claim 1, wherein the selection is received from a user, and wherein the processor, when incrementing the counter value, is further configured to:

determine a length of time that the STB provides the program in connection with the selection;

increment the counter value rating by a first value when the length of time is less than a threshold length of time; and incrementing the counter value rating by a second value that is greater than the first value when the length of time greater than or equal to the threshold length of time.

19. The computer-readable memory device of claim 9, wherein the selection is received from a user, and wherein one or more instructions further cause the processor to:

identify an average amount of time that the user watched one or more other programs, and calculate the threshold amount of time as based on the average amount of time that the user watched the one or more other programs.

20. The computer-readable memory device of claim 9, wherein the input is received from a first user, and wherein the one or more instructions further cause the processor to:

determine whether the first user or a second user is using the STB at the first time, wherein the process causes the STB to tune to the first channel at the first time further based on determining that the first user is using the STB at the first time.

* * * * *